US008856086B2

(12) United States Patent
Chao et al.

(10) Patent No.: US 8,856,086 B2
(45) Date of Patent: Oct. 7, 2014

(54) ENSURING INTEGRITY OF SECURITY EVENT LOG UPON DOWNLOAD AND DELETE

(75) Inventors: Ching-Yun Chao, Raleigh, TX (US); John Yow-Chun Chang, Apex, TX (US); Bertrand Be-chung Chiu, Jr., Austin, TX (US); Douglas Yellow Shue, Los Altos, CA (US); Yuhsuke Kaneyasu, Tokyo (JP); Jay William Warfield, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 13/593,583

(22) Filed: Aug. 24, 2012

(65) Prior Publication Data
US 2014/0059013 A1 Feb. 27, 2014

(51) Int. Cl.
*G06F 17/30* (2006.01)
(52) U.S. Cl.
USPC .......................................................... 707/690
(58) Field of Classification Search
USPC ............ 707/2, 3, 690; 709/204, 206; 713/176
See application file for complete search history.

(56) References Cited

U.S. PATENT DOCUMENTS

| | | | |
|---|---|---|---|
| 2002/0112162 A1* | 8/2002 | Cocotis et al. ................. | 713/176 |
| 2005/0289354 A1 | 12/2005 | Borthakur et al. | |
| 2007/0038703 A1* | 2/2007 | Tendjoukian et al. ......... | 709/206 |
| 2008/0275951 A1* | 11/2008 | Hind et al. ..................... | 709/204 |
| 2010/0037062 A1* | 2/2010 | Carney .......................... | 713/176 |
| 2010/0218002 A1 | 8/2010 | Graziani | |
| 2011/0131188 A1 | 6/2011 | Graziani et al. | |

OTHER PUBLICATIONS

IBM, "Data Capture and Event Logging to support Event Framework of Content Management System", IP.com Reference No. IPCOM000183013D, May 12, 2009.
Anonymous, "A mechanism for communicating event information robustly between a distributed runtime and a database, using the injection of control commands into the event stream", IP.com Reference No. IPCOM000201699D, Nov. 18, 2010.
Hakim et al, "Virtualization with IBM Workload Deployer: Designing and Deploying Virtual Systems", IBM Redbooks, Nov. 2011.
Daci et al, "Improving data integrity and performance of cryptographic structured log file systems", ATI, Nov. 2011.

* cited by examiner

*Primary Examiner* — Etienne Leroux
(74) *Attorney, Agent, or Firm* — Jeffrey S. LaBaw; David H. Judson (57) ABSTRACT

A cloud deployment appliance includes a mechanism to enable permitted users to move event records reliably from an internal event log of the appliance to a data store located external to the appliance while ensuring the integrity of event records. The mechanism ensures that the event records are not tampered with in storage or during download. Further, the approach ensures that no event records can be removed from the appliance internal storage before being successfully downloaded to the external data store.

21 Claims, 6 Drawing Sheets

ENSURING INTEGRITY OF SECURITY EVENT LOG UPON DOWNLOAD AND DELETE

BACKGROUND OF THE INVENTION

1. Technical Field

This disclosure relates generally to auditing of events in the context of a "cloud" compute environment and, in particular, to techniques to ensure the integrity of security event log data that is being actively managed in the system.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run networked applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

It is known in the art to provide an appliance-based solution to facilitate rapid adoption and deployment of cloud-based offerings. One such appliance is IBM® Workload Deployer, which is based on the IBM DataPower® 7199/9005 product family. Typically, the appliance is positioned directly between the business workloads that many organizations use and the underlying cloud infrastructure and platform components. Because of this unique position, the appliance can receive and act upon operational data, and it can monitor application workload demand conditions and adjust resource allocation or prioritization as required to achieve established service level agreements. IBM Workload Deployer also may be used to manage a shared, multi-tenant environment, where isolation and security are important. To that end, a security and administrative event auditing function may be used to capture all records of all activities in the system. These events include, without limitation, security events such as authentication, access control, digital signature validation, and the like, as well as administrative types of events such as configuration data access and updates. Event records are stored internally in an event log, which is typically implemented in the appliance as a relational database. An interface (e.g., REST-based) enables customers to access and download the event records to persistent storage external to the appliance (e.g., for long term archival), and to subsequently remove the event records from internal storage in the appliance itself.

While this event auditing function works well for its intended purpose, there is a need to protect the integrity of the event log data to ensure that no event records will be removed from the internal appliance data store before they are downloaded successfully to the external data store.

BRIEF SUMMARY

According to this disclosure, a cloud deployment appliance includes a mechanism to enable permitted users to move event records reliably from an internal event log of the appliance to a data store located external to the appliance while ensuring the integrity of event records. The mechanism ensures that the event records are not tampered with. In particular, the approach ensures that event record(s) cannot be removed from the appliance internal storage before being successfully downloaded to the external data store.

In one embodiment, a mechanism exports (e.g., as REST-based APIs) two (2) distinct interfaces: a "first" or download event records interface, and a "second" or delete event records interface. The first interface enables authorized users to download event records from appliance box internal storage, and the second interface enables users to remove from appliance box internal storage those events (or, more generally, data) that have been downloaded successfully. Preferably, the download event records interface operates (in response to a request to download event records) to return the following data set to a permitted user: (a) a set of requested event records, (b) a checksum (e.g., a cryptographic hash) of those event records (or some portion thereof), (c) a map object (or, more generally, an identifier) that specifies those event records, and (d) a separate digital signature of both (i) the checksum, and (ii) the map object. The delete event records interface uses information provided in that data set to determine whether a delete operation is permitted. According to this disclosure, a delete operation requested via the second interface is performed only if the map object maps to consecutive (or certain) event records that are at a given position (preferably, the very top) of the appliance event storage; typically, these records are the very oldest event records.

In particular, preferably the mechanism implements a "download and delete" functionality that ensures only tamper-free and correctly-downloaded event records are removed from the appliance box internal event log. The routine begins by invoking the download event record interface, typically in response to a request to download event records. The separate digital signatures of the checksum and the map object are then validated, and then the checksum is validated (e.g., by re-generating the cryptographic hash from the event records and comparing the result to the checksum provided by the first interface). If all of the validations return successfully, the delete event record interface is then invoked to remove those event records that have been successfully downloaded from the appliance box.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
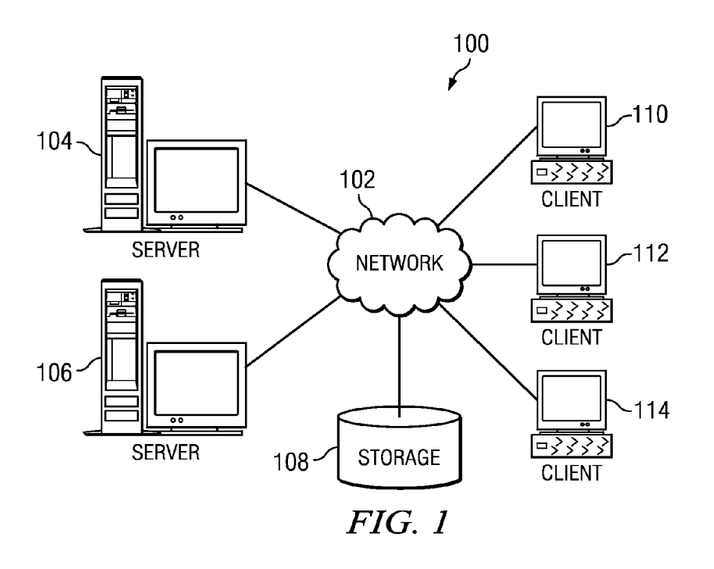
FIG. 1 depicts an exemplary block diagram of a distributed data processing environment in which exemplary aspects of the illustrative embodiments may be implemented.
Figure 2:
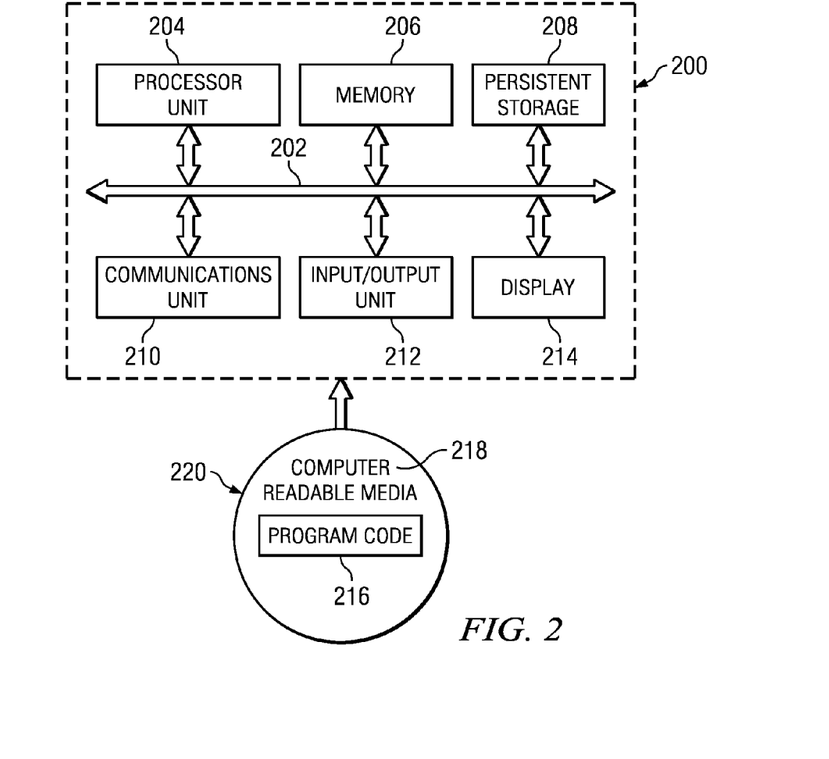
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse.

Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
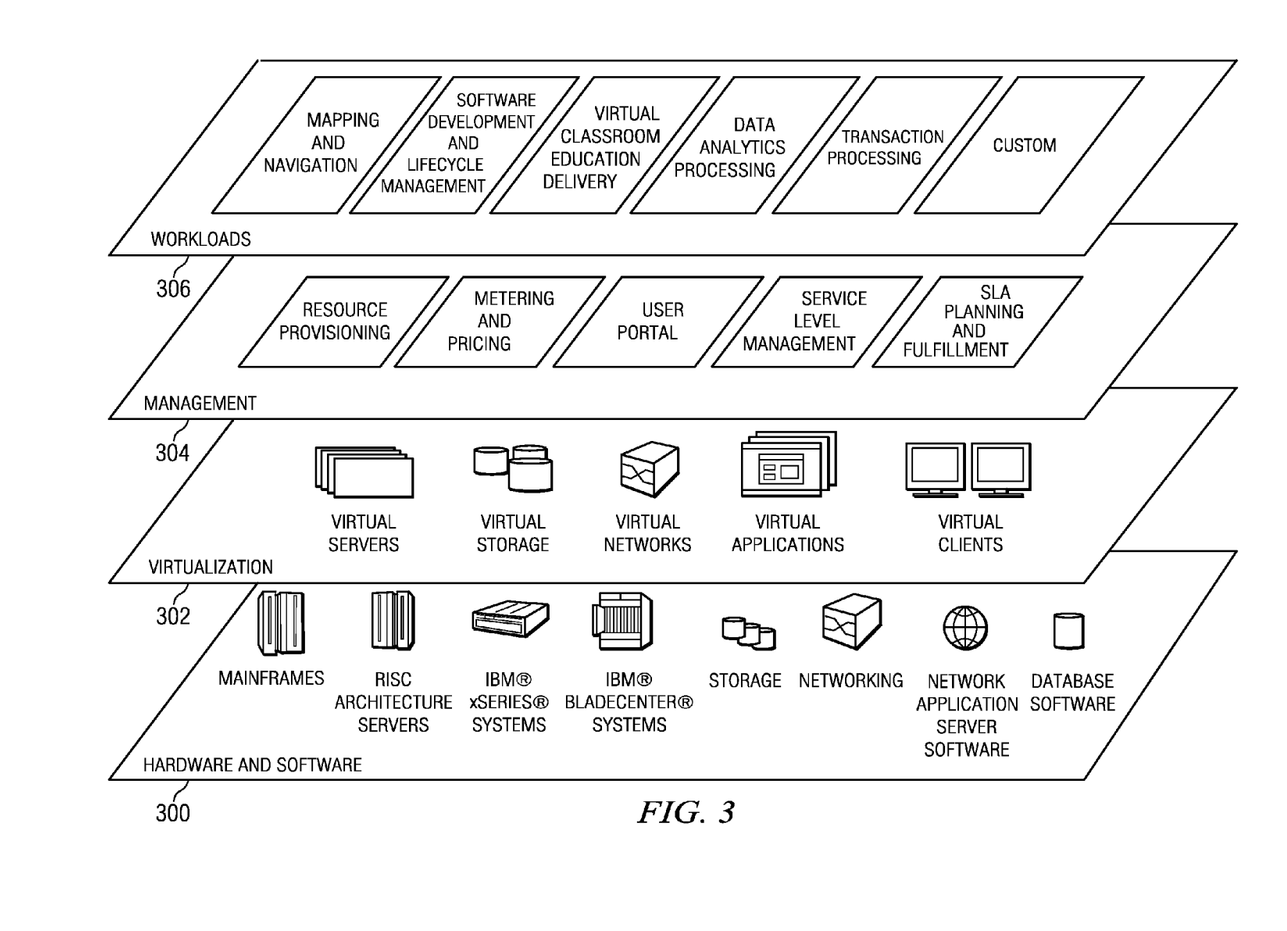
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Cloud Deployment Technologies

It is known to provide an appliance-based solution to facilitate rapid adoption and deployment of both Infrastructure and Platform as Service offerings. As described above, one such appliance is IBM Workload Deployer, and this appliance also may be used to manage a shared, multi-tenant environment, where isolation and security are of utmost importance. The secure nature of the physical appliance (sometimes referred to herein as a box) typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns. The appliance also includes advanced compression and storage techniques that enable a large number of these virtual images (each of which may be sizeable) to be stored.

In operation, the appliance can provision standard and customized middleware virtual images and patterns that can be securely deployed and managed within private or on-premise cloud computing environments. These virtual images can help organizations to develop, test, and deploy business applications easily and quickly, thus ending the manual, repetitive, and error prone processes that are often associated with creating these complex environments. Upon completion, resources are returned to the shared resource pool automatically for future use and are logged for internal charge-back purposes. The appliance also manages individual user and group access to resources, providing IT managers with the control needed to optimize efficiency at a fine-grain level.

Typically, the appliance includes hardware and firmware cryptographic support to encrypt all the data on hard disk. This data includes, without limitation, event log data. No users, including administrative users, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance.

Figure 4:
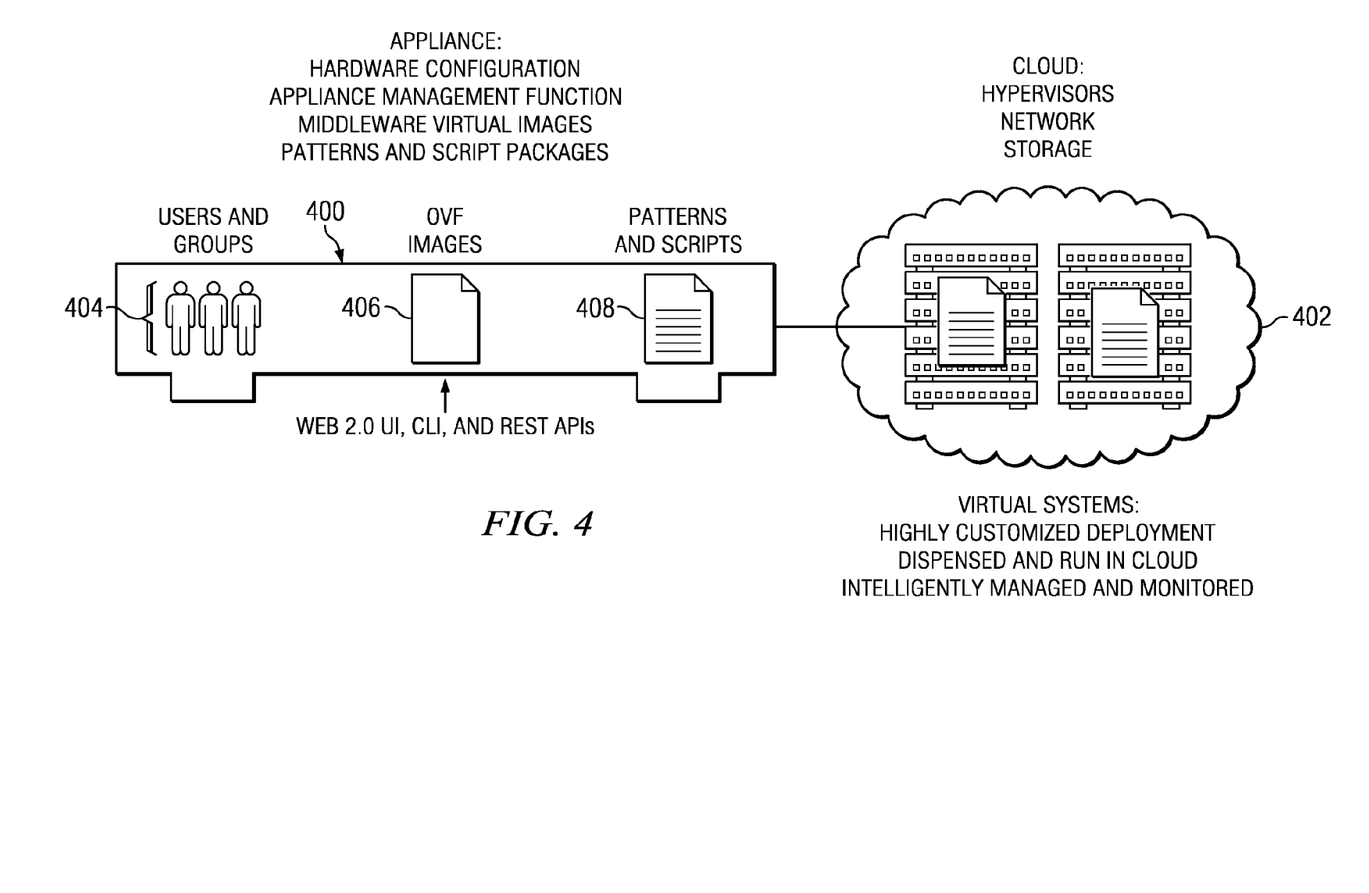
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 402. The appliance may be implemented using a data processing system such as described above with respect to FIG. 2. Preferably, the appliance 400 includes a Web 2.0-based user interface (UI), a command line interface (CLI), and REST-based application programming interfaces (APIs). The appliance provides a management function that enables the rapid deployment of cloud-based solutions. To that end, the appliance provides storage for (i) data 404 used to manage user and group access to resources, (ii) for pre-loaded and/or customizable middleware virtual images 406, and (iii) for configurable patterns and script packages 408. Patterns are logical descriptions of both the physical and virtual assets that comprise a particular solution. The management function and interfaces provide a template-based approach to construction that permits the rapid creation and modification of an otherwise complex set of hardware and software components. In particular, the use of patterns allows an organization to construct an individual element or integrated solution one time, and then to dispense the final product on demand. Typically, there are two types of patterns: virtual system patterns provide the most flexibility and customization options of the two types. It consists of an operating system and, potentially, additional software solutions, such as WebSphere® Application Server. Virtual application patterns are optimized and are constructed typically for the purpose of supporting a singular workload.

As also seen in FIG. 4, the on-premise or private cloud environment 402 on which the middleware application runs typically constitutes hypervisors, networking infrastructure, and storage devices that are allocated to the appliance. A representative environment may be implemented in the manner described above with respect to FIG. 3.

Figure 5:
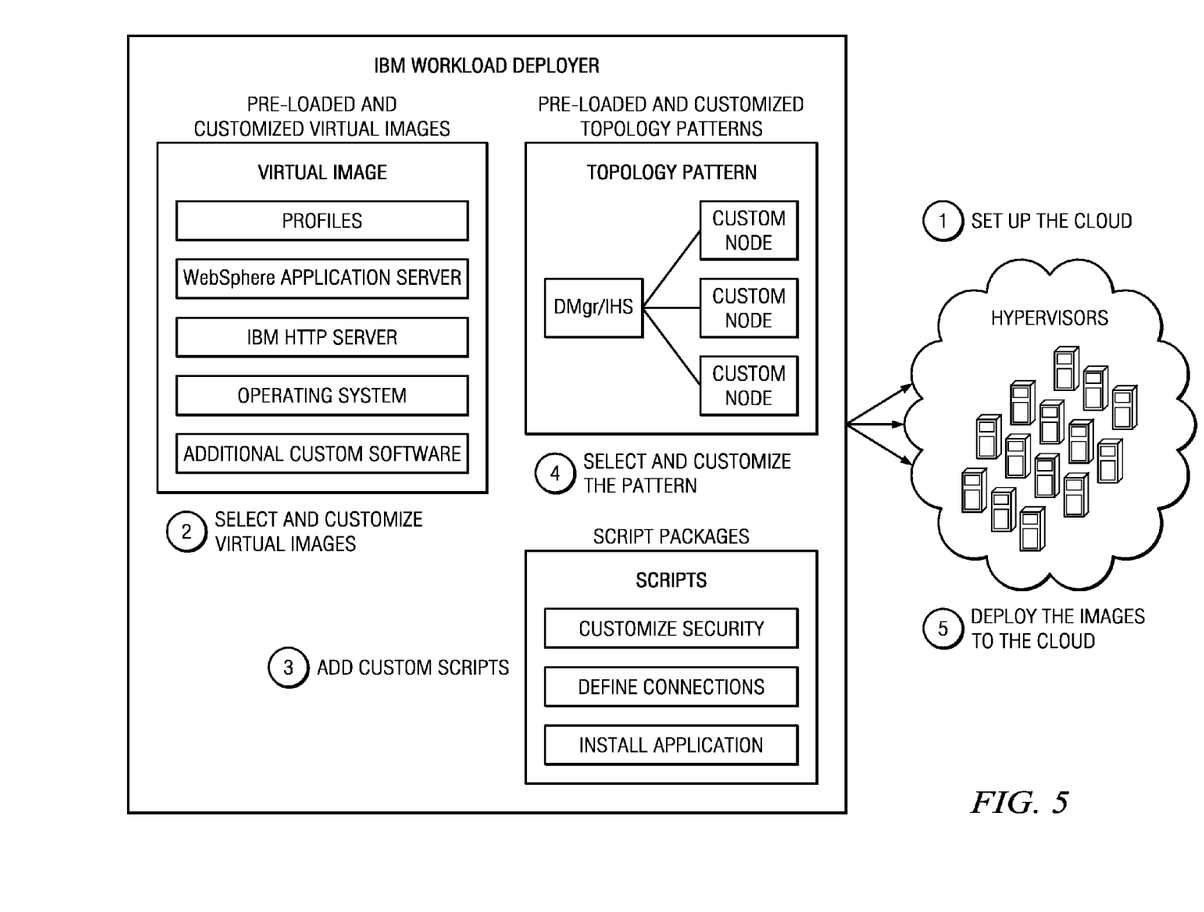
FIG. 5 illustrative representative functional components of the network-based appliance.

FIG. 5 illustrates how the appliance can be used to build a custom private cloud. At step 1, the hardware, hypervisors and networking for the cloud are identified. At step 2, the user selects and customizes the virtual images. At step 3, the user adds one or more script packages as needed to customize the deployed middleware environment. At step 4, pre-installed or customized patterns are used to describe the middleware topology to be deployed. Patterns can be built from virtual images, e.g. using a drag-and-drop interface. At step 5, the virtual systems are deployed to the cloud.

The references herein to IBM Workload Deployer are exemplary and should not be taken to limit the disclosed technique, which may be implemented on any appliance (or, more generally, machine) having the general characteristics and operating functionality that has been described.

Ensuring Integrity of Security Event Log Upon Download and Delete

With the above as background, the subject matter of this disclosure is now described. Without limitation, the subject matter may be implemented within or in association with a cloud deployment appliance as has been described. According to this disclosure, a mechanism is provided to enable permitted users (e.g., customer IT administrators) to move event records reliably from an internal event log (or, more generally, an internal data store) of the appliance to a data store (e.g., archival storage) located external to the machine while ensuring the integrity of event records. The mechanism and the disclosed technique ensure that the event records (sometimes referred to herein as "download event records") are not tampered with; further, the approach ensures that no event records can be removed from the appliance internal storage before being successfully downloaded to the external data store. Without intending to be limited, in general the event log records include: user activity, resource, definition or configuration changes, security events and security changes, and the like. More specifically, the following data may be collected on the appliance: appliance startup/shutdown, logins (successful and failed), user and group updates, configuration changes, session timeouts, profile updates, and creation, deletion or update of hypervisors, IP or IP groups, patterns, disk images, script packages, emergency fixes, and the like. In addition, the following data may be collected regarding the cloud: security violations, data deletions, mass data transfers, failed data access attempts, accesses to all protected resources, process invocations, session timeouts, and creation, deletion or updates to virtual images.

Figure 6:
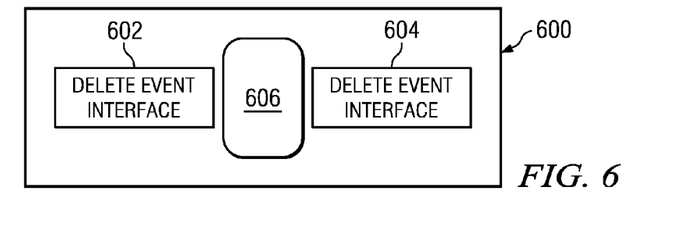
FIG. 6 illustrates a mechanism associated with the appliance that supports the functionality of this disclosure.

According to this disclosure, the following approach is used to ensure the integrity of event records (and the event record data therein) during the download process. The approach typically is implemented in a mechanism, such as software, e.g., one or more computer programs, executable by one or more processors of a data processing system (such as shown above in FIG. 2). As illustrated in FIG. 6, preferably the mechanism 600 exports (as REST-based APIs) two (2) distinct interfaces: a "first" or download event records interface 602, and a "second" or delete event records interface 604. The first interface enables authorized users to download event records from appliance box internal storage, and the second interface enables users to remove from appliance box internal storage those events (or, more generally, data) that have been downloaded successfully. In operation, the download event records interface 602 preferably operates to return the following data set to the user: (a) a set of requested event records, (b) a checksum (e.g., a cryptographic hash) of those event records (or some portion thereof), (c) a map object (or, more generally, an identifier) that specifies those event records (or some portion thereof), and (d) a separate digital signature of both (i) the checksum, and (ii) the map object.

The cryptographic hash may be generated using any known cryptographic function, such as MD5, SHA-1, or the like. The digital signature is generated using a digital signature scheme. Such a scheme typically comprises a key generation algorithm that obtains a private key having a corresponding public key, a signing algorithm that, given a message and the private key, generates the digital signature, and a signature verifying algorithm that, given a message, the public key and a signature, either accepts or rejects a claim that the message is authentic. Diffie-Hellman and RSA are representative digital signature schemes.

The delete event records interface 604 uses information provided in that data set to determine whether a delete operation is permitted. In particular, the delete event record interface takes the map object (element (c)) as well as the digital signature (element (d)(ii)) as input parameters. A check is then performed to validate the signature of the mapping. The signature verifying algorithm and the key information is used for this purpose. In response to the validation, a delete operation is performed; if the validation does not succeed, however, the delete operation is not performed (and an error message optionally returned). In particular, a delete operation requested via the second interface is performed only (as will be indicated by the validation) if the map object maps to consecutive event records that are at a given position (preferably, the very top) of the appliance event storage; typically, these records are the very oldest event records.

Figure 7:
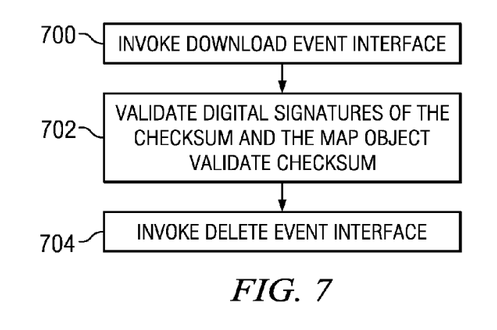
FIG. 7 illustrates a process flow of a "download and delete" utility of this disclosure to ensure that only tamper-free and correctly-downloaded event records are removed from the appliance box internal event log.

FIG. 7 illustrates a process flow of a multi-step "download and delete" utility according to this disclosure. This utility is also illustrated as 606 in FIG. 6 as an operation that bridges the download and delete interfaces. Operation of this utility ensures that only tamper-free and correctly-downloaded event records are removed from the appliance box internal event log. The routine begins at step 700 by invoking the download event record interface. At step 702, the utility validates the separate digital signatures of the checksum and the map object, and then validates the checksum (e.g., by re-generating the cryptographic hash from the event records and comparing the result to the checksum provided by the first interface). Objects are stored in the downloaded data set as defined above; thus, in the event of an incomplete download, either some data object will be missing and can be detected, or the digital signature and/or checksum validation will fail. The checksum validation is optional. If the validations succeed, the event records are considered to have been successfully downloaded from the appliance box. At step 704, and assuming that the validation operations have succeeded, the utility invokes the delete event record interface to remove those event records that have been successfully downloaded from the appliance box. If a validation operation does not succeed, an error message may be returned (not shown). This completes the process.

Thus, according to the technique described above, a method of ensuring the integrity of the event log uses the first download event interface to download a set of requested event records, together with a checksum of the event records and a digitally-signed mapping of the event records. If the signature of the mapping can be verified, the second delete event interface deletes a record if the mapping corresponds to one or more events in the log file (e.g., the oldest event records).

Figure 8:
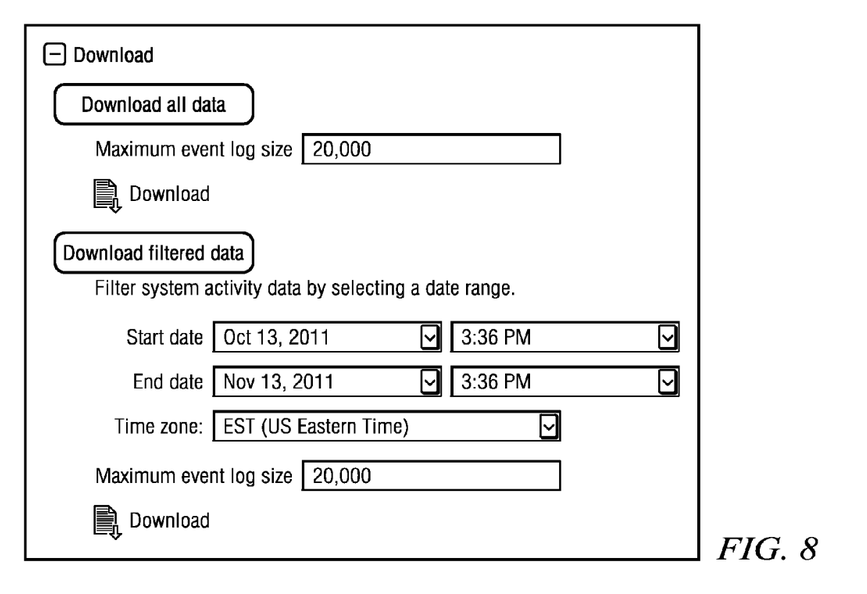
FIG. 8 illustrates a representative Web-based download interface that is exposed by the appliance.

The following provides additional details regarding an implementation of the above-described subject matter. As noted above, the appliance typically exports a Web-based UI, a CLI, and one or more REST-based APIs. FIG. 8 illustrates a representative download interface of the Web-based UI. This interface may be an SSL-secured web page. In this example, the download function provides two (2) different ways to download event log records using the administrative console. Any processing of data in the event log typically starts with the oldest data available. The first option (Download all data) downloads the number of records requested, starting with the oldest records available. A default and maximum value may be configured. The second option (Download filtered data) also downloads the number of records requested, but has the additional filter of a date and time stamp. The Download filtered data downloads the oldest records within this date range. A default and maximum value may be entered and enforced. Typically, a timestamp within the downloaded records is in UTC. In both these types of downloads, no auditing records are deleted. In the alternative to the Web-based UI, the CLI may be used to specify the files for download.

The techniques described herein download event log records using the REST-based API. This interface is implemented using one or more scripts, which may require support for shell scripts, Python, Java, CURL, and a file archiving utility. The Linux operating system environment is well-suited for running the scripts. In a representative implementation, there are three (3) scripts involved in this download process. A first script is create_basicauth_header.py, which is a script that handles authentication using a user ID/password, the appliance keys, and optionally the appliance certificate. The first script is called by a second script, cscurl.sh, that is used for one-time downloads. It has numerous parameters passed to it, including an auditor user ID, password, appliance IP address, a key file, optionally a0 certificate file, a REST API URL, and an output file destination. Additionally, the second script is invoked from a third script, the auditFetch.sh script. This last script is used for automated downloads. From the parameters passed to it, it dynamically generates a REST API URL, and then it invokes cscurl.sh with the correct parameters. The parameters passed to auditFetch.sh are: auditor user ID, password, key file, appliance IP address, the number of records to download, and an output file destination.

Figure 9:
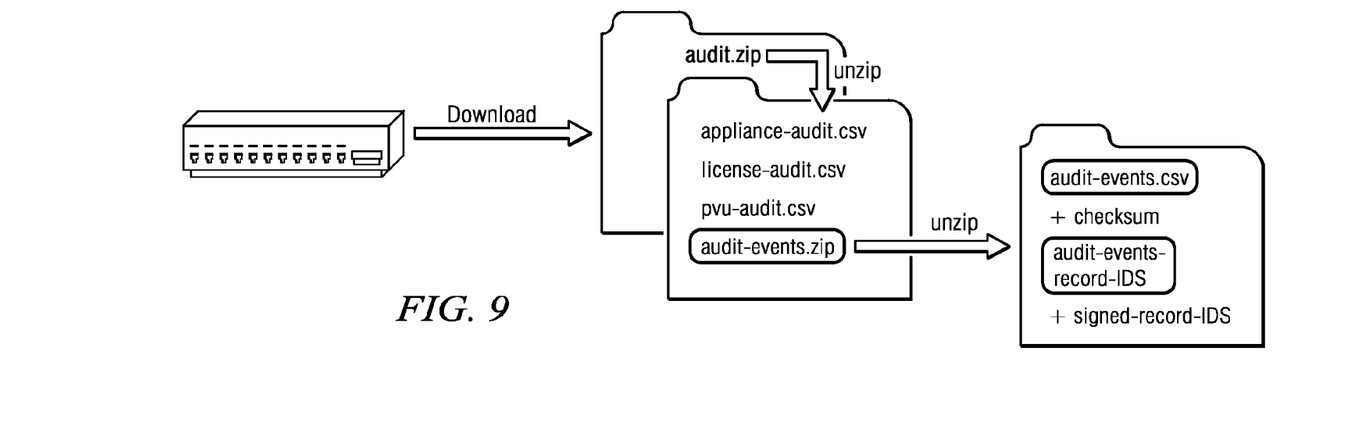
FIG. 9 illustrates the result of executing a download function using a first download event interface.

Referring to FIG. 9, and regardless of which of the download request methods (Web UI, CLI or REST-based API) is used to download event log records, the result is a file 900 that preferably includes several files. Typically, the file is in a .zip format and includes four (4) files: appliance-audit.csv, a file that contains auditing records as provided in previous versions, license-audit.csv, a file that contain licensing usage information, pvu-audit.csv, a file that contains pvu usage information, and audit-events.zip, a .zip file that contains security and administrative event log records. The audit-events.zip file preferably contains these four files, audit-events.csv, which contains auditing records in CSV format, audit-events-signed-events-checksum, a file that contains a signed checksum for the audit-events.csv file, auditevent-record-IDs a file that contains the IDs for subsequent deletion of records, and audit-eventssigned-record-IDs, a file that contains a digital signature for the record IDs file for the subsequent deletion of records. The audit-events-signed-events-checksum file is archived along with the audit-events.csv file. Preferably, the event log record attributes (the audit-events.csv) comprises event log records in a comma separated value (CSV) format, with each record having field values such as firmware version, timestamp, resource value, action, resource ID, resource name, user, and client IP. These fields are followed by name-value pairs for the event data itself. Of course, the types and number of fields varies based on the type of record. These file formats and values are merely representative, as other file formats and conventions may be used.

Figure 10:
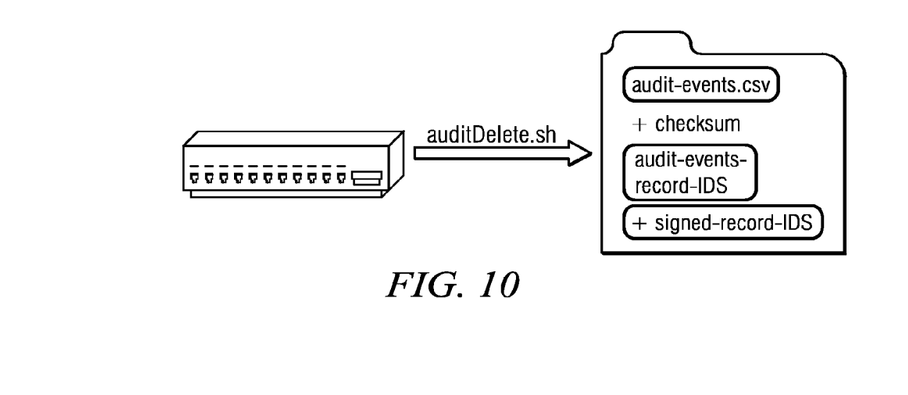
FIG. 10 illustrates how a delete event record interface is used to delete account records from the appliance.

The audit record delete function also is implemented via an interface (e.g., a REST-based API), which is now described and illustrated in FIG. 10. This API also implements a shell script, referred to herein as auditDelete.sh, and that is called to delete audit records. The auditDelete.sh script requires these parameters: auditor user ID and password, a key file, and an appliance IP address. As has been described, this script also uses the audit-events-record-IDs file and the audit-events-signed-records-IDs file from the download, either passed as parameters to the script or located in the same directory as the script invocation. Preferably, the audit record delete function is executed as often as necessary to prevent loss of event log records on appliance. As has been described, and by implementing the functionality that has been described above, only event log records that have been downloaded (to the external data store) can be deleted. Preferably, deletes start with the oldest records, and only a user account with a given permission (e.g., "auditor with full permissions") can delete audit records.

Preferably, the first interface fetches and delivers in sets of a given number (e.g., 500) records and those records are contiguous, i.e., there are no gaps in record IDs. Preferably, a partial set cannot be deleted.

The above-described subject matter provides many advantages. It enable permitted users to move event records reliably from an internal event log of the appliance to a data store located external to the appliance while ensuring the integrity of event records. As described above, the mechanism ensures that the event records are not tampered with. In particular, the approach ensures that event record(s) cannot be removed from the appliance internal storage before being successfully downloaded to the external data store. More generally, the technique provides improved auditing capabilities for the appliance to ensure accountability of user activity, to enable data to be provided securely for forensic analysis of suspicious activity or security attacks, to satisfy monitoring and archiving requirements of government regulations, and to enable or facilitate regulatory compliance. As noted above, the technique ensures the integrity and confidentiality of the auditing and administrative event log records. Another advantage of the approach is to provide for the efficient and reliable use of the appliance's audit capability. In particular, if the event log records are not deleted on a regular basis or quickly enough, the event log may become full (e.g., greater than a pre-configured utilization). If this occurs, the appliance continues to run normally, however, all new auditing records might then be discarded. The subject technique thus also enables reliable download and deletion of enough audit records to allow the automatic re-enablement of event logging.

The technique described herein (exposing a separate REST API for delete) solves several problems. It allows a complete de-coupling of the delete stage, and it allows the delete to occur at a future time (un-associated with the download time); thus, the technique ensures that no event records that have not been previously delivered are inadvertently deleted. The technique also allows the delete to occur securely. Moreover, by forcing the client to send back the list of IDs and its signed hash, the approach guarantees that the list is not tampered with; this ensures that the API deletes only what was delivered from the appliance. Further, because preferably the event records are blocked into sets, and only the blocked set can be deleted, the approach prevents users from arbitrarily deleting some arbitrary number of records, in the middle of thousands, or some other possibly suspicious pattern.

The technique described herein provides a guarantee that, prior to being deleted from the appliance, a set of fetched records have been successfully delivered to the client requestor.

While a preferred operating environment and use case (a cloud deployment appliance) has been described, the techniques herein may be used in any other operating environment in which it is desired to enable permitted users to move data reliably from a first, internal data store, to a second, external data store while ensuring that the data cannot be preemptively removed from the internal data store before being successfully downloaded to the external data store.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As explained, the scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method of ensuring integrity of a log file that includes consecutive event records, comprising:
   returning, using a first interface implemented in a machine having a hardware element and in response to a request, a set of requested event records, together with a digitally-signed mapping associated with the requested event records;
   determining that the set of requested event records returned in response to the request represent consecutive event records in the log file by evaluating whether the digitally-signed mapping can be validated; and
   if the mapping can be validated, using a second interface implemented in the machine and distinct from the first interface to delete from the log file one or more event records in the set of requested event records.

2. The method as described in claim 1 wherein the first interface also returns a checksum of the event records.

3. The method as described in claim 2 wherein the determining step also determines whether the checksum of the event records can be re-generated.

4. The method as described in claim 2 wherein the checksum is digitally-signed.

5. The method as described in claim 1 wherein the one or more event records in the set of requested event records that are deleted are an oldest set of event records.

6. The method as described in claim 1 wherein the digitally-signed mapping corresponds to consecutive events in the log file.

7. The method as described in claim 1 wherein the requested event records include audit data associated with a cloud resource, the audit data representing one of: user activity, a security event, and a configuration change.

8. Apparatus, comprising:

a processor;

computer memory holding computer program instructions that when executed by the processor perform a method of ensuring integrity of a log file that includes consecutive event records, the method comprising:

in response to a request, returning a set of requested event records, together with a digitally-signed mapping associated with the requested event records;

determining that the set of requested event records returned in response to the request represent consecutive event records in the log file by evaluating whether the digitally-signed mapping can be validated; and if the mapping can be validated, deleting from the log file one or more event records in the set of requested event records.

9. The apparatus as described in claim 8 wherein the method further includes the step of returning a checksum of the event records.

10. The apparatus as described in claim 9 wherein the determining step also determines whether the checksum of the event records can be re-generated.

11. The apparatus as described in claim 9 wherein the checksum is digitally-signed.

12. The apparatus as described in claim 8 wherein the one or more event records in the set of requested event records that are deleted are an oldest set of event records.

13. The apparatus as described in claim 8 wherein the digitally-signed mapping corresponds to consecutive events in the log file.

14. The apparatus as described in claim 8 wherein the requested event records include audit data associated with a cloud resource, the audit data representing one of: user activity, a security event, and a configuration change.

15. A computer program product in a non-transitory computer readable medium for use in a data processing system, the computer program product holding computer program instructions which, when executed by the data processing system, perform a method of ensuring integrity of a log file that includes consecutive event records, the method comprising:

in response to a request, returning a set of requested event records, together with a digitally-signed mapping associated with the requested event records;

determining that the set of requested event records returned in response to the request represent consecutive event records in the log file by evaluating whether the digitally-signed mapping can be validated; and if the mapping can be validated, deleting from the log file one or more event records in the set of requested event records.

16. The computer program product as described in claim 15 wherein the method further includes the step of returning a checksum of the event records.

17. The computer program product as described in claim 16 wherein the determining step also determines whether the checksum of the event records can be re-generated.

18. The computer program product as described in claim 16 wherein the checksum is digitally-signed.

19. The computer program product as described in claim 15 wherein the one or more event records in the set of requested event records that are deleted are an oldest set of event records.

20. The computer program product as described in claim 15 wherein the digitally-signed mapping corresponds to consecutive events in the log file.

21. The computer program product as described in claim 15 wherein the requested event records include audit data associated with a cloud resource, the audit data representing one of: user activity, a security event, and a configuration change.

* * * * *